US009423897B2

(12) United States Patent
Bae (10) Patent No.: US 9,423,897 B2
(45) Date of Patent: Aug. 23, 2016

(54) ELECTRONIC DEVICE DISPLAY WITH SHIELDING LAYER

(71) Applicant: Apple Inc., Cupertino, CA (US)

(72) Inventor: Hopil Bae, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 173 days.

(21) Appl. No.: 13/854,376

(22) Filed: Apr. 1, 2013

(65) Prior Publication Data
US 2014/0293144 A1  Oct. 2, 2014

(51) Int. Cl.
G06F 3/041 (2006.01)
G02F 1/1345 (2006.01)

(52) U.S. Cl.
CPC ............ G06F 3/041 (2013.01); G02F 1/13452 (2013.01); *G06F 2203/04103* (2013.01); *G06F 2203/04107* (2013.01)

(58) Field of Classification Search
CPC .......... G06F 2203/04107; G06F 3/041; G06F 3/0412; G02F 1/13452; G02F 2001/133334
USPC .......... 345/173, 174, 102; 178/18.06; 349/12, 349/61, 69, 70; 362/97.1–97.3
See application file for complete search history.

(56) References Cited

U.S. PATENT DOCUMENTS

| | | | |
|---|---|---|---|
| 4,663,670 A | 5/1987 | Ito et al. | |
| 5,521,612 A | 5/1996 | Johansson | |
| 6,599,681 B2 | 7/2003 | Gilson | |
| 7,439,962 B2 | 10/2008 | Reynolds et al. | |
| 8,049,862 B2 | 11/2011 | Huang et al. | |
| 8,451,244 B2 | 5/2013 | Hotelling et al. | |
| 2002/0101399 A1* | 8/2002 | Kubo ................... | G02F 1/13338 345/104 |
| 2004/0114372 A1 | 6/2004 | Han et al. | |
| 2005/0073632 A1* | 4/2005 | Dunn ................ | G02F 1/133382 349/110 |
| 2006/0125973 A1* | 6/2006 | Akiyama .................. | G09F 9/30 349/58 |
| 2011/0012845 A1* | 1/2011 | Rothkopf ................ | G06F 3/044 345/173 |
| 2011/0079501 A1* | 4/2011 | Arai ..................... | G02F 1/13452 200/600 |
| 2011/0169767 A1* | 7/2011 | Weindorf ............ | G02F 1/13338 345/174 |
| 2011/0169783 A1* | 7/2011 | Wang .................... | G06F 3/0412 345/176 |
| 2011/0285640 A1* | 11/2011 | Park ..................... | G02F 1/13338 345/173 |
| 2012/0087065 A1 | 4/2012 | Kim et al. | |
| 2013/0169597 A1 | 7/2013 | Yin et al. | |
| 2015/0062458 A1* | 3/2015 | Nakamura ................ | G06F 3/01 349/12 |

* cited by examiner

*Primary Examiner* — Lun-Yi Lao
*Assistant Examiner* — Ibrahim Khan
(74) *Attorney, Agent, or Firm* — Treyz Law Group, P.C.; G. Victor Treyz; Zachary D. Hadd (57) ABSTRACT

A display may have a color filter layer and a thin-film transistor layer. A layer of liquid crystal material may be located between the color filter layer and the thin-film transistor layer. A transparent conductive shielding layer may be formed on the lower surface of the thin-film transistor layer. Grounding structures may ground the transparent conductive shielding layer to a ground. The ground may be formed form metal traces on a flexible printed circuit. The display may have a backlight unit. Light-emitting diodes may be used to provide backlight for the backlight unit. The light-emitting diodes may be mounted on the flexible printed circuit. The grounding structures may be formed from a rectangular ring-shaped conductive tape or other conductive structures.

19 Claims, 10 Drawing Sheets

FIG. 15

ELECTRONIC DEVICE DISPLAY WITH SHIELDING LAYER

BACKGROUND

This relates generally to electronic devices, and more particularly, to electronic devices with displays.

Electronic devices often include displays. For example, cellular telephones and portable computers often include displays for presenting information to a user.

Displays contain arrays of display pixels for generating images. The display pixels are controlled using display driver circuitry. Touch screen displays include touch sensor arrays. Touch sensor arrays such as capacitive touch sensor arrays can be incorporated into a display to provide the display with the ability to accept touch commands from a user.

If care is not taken, a display can generate interference signals that can disrupt operation of sensitive components in a device. For example, wireless radio-frequency transceiver circuitry may be susceptible to interference from a display. Touch sensor arrays in displays may also be susceptible to interference. For example, signal sources such as integrated circuits within a device may generate signals that can disrupt touch sensor operation.

It would therefore be desirable to be able to provide electronic devices that are less susceptible to disruption from these types of interference.

SUMMARY

A display may have a color filter layer and a thin-film transistor layer. A layer of liquid crystal material may be located between the color filter layer and the thin-film transistor layer. A transparent conductive shielding layer may be formed on the lower surface of the thin-film transistor layer. The display may include a touch sensor array. The shielding layer may prevent display interference from disrupting operation of internal components in an electronic device and may prevent interference from the internal components from interfering with the touch sensor array.

Grounding structures may ground the transparent conductive shielding layer to a ground. The ground may include metal traces on a flexible printed circuit. The display may have a backlight unit. Light-emitting diodes may be used to provide backlight for the backlight unit. The light-emitting diodes may be mounted on the flexible printed circuit. The grounding structures may be formed from a rectangular ring-shaped conductive tape or other conductive structures.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, 3, and 4.

Figure 1:
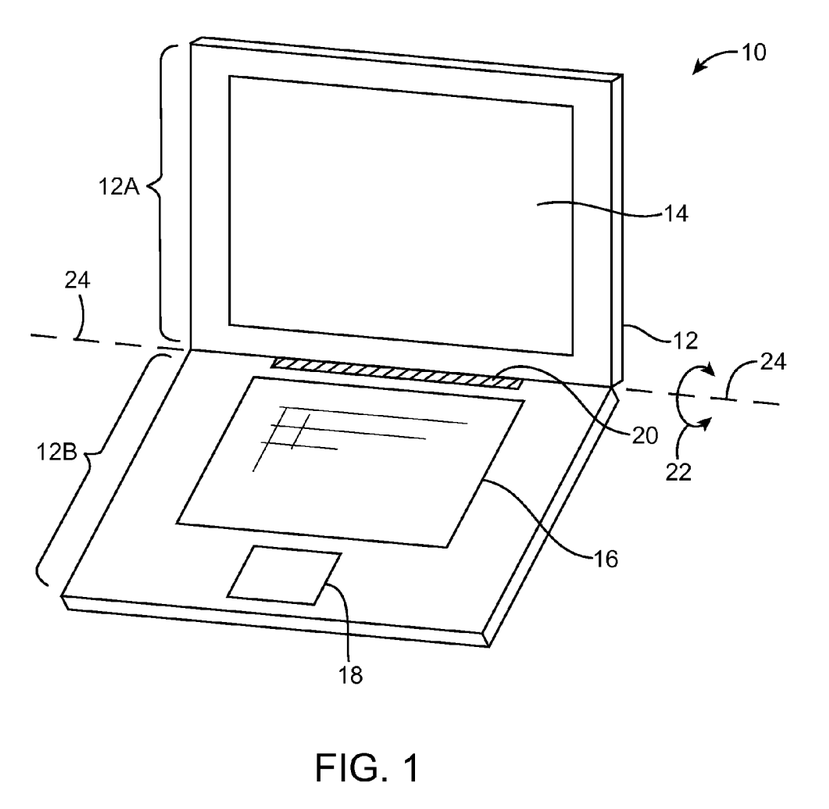
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
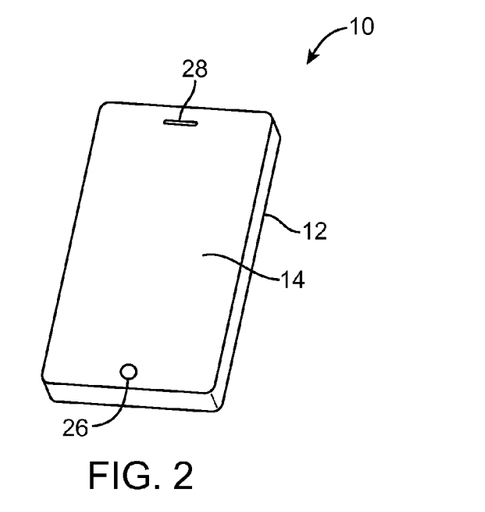
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
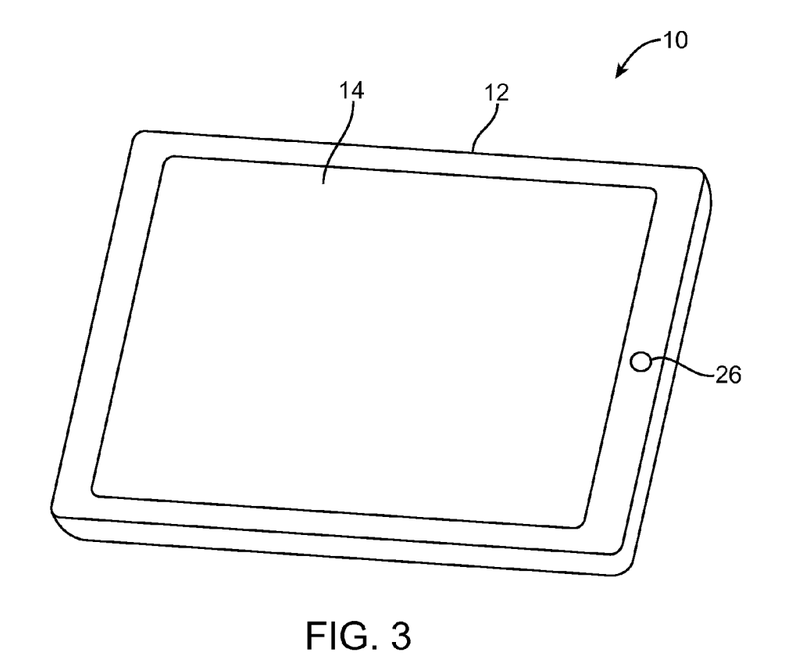
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
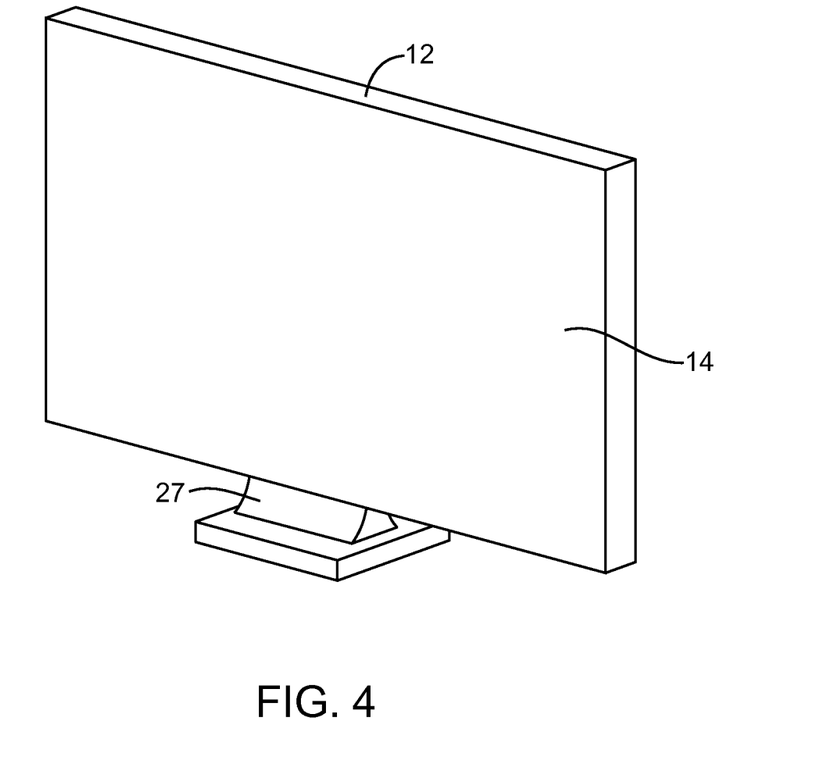
FIG. 4 is a perspective view of an illustrative electronic device such as a computer display with display structures in accordance with an embodiment of the present invention.

FIG. 4 shows how electronic device 10 may be a computer display or a computer that has been integrated into a computer display. With this type of arrangement, housing 12 for device 10 may be mounted on a support structure such as stand 27. Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Touch sensor components such as capacitive touch sensor electrodes may be incorporated into display 14 using a substrate that is separate from other substrate layers in the display or may be formed from conductive structures that are patterned onto the same substrate in display 14 as display pixel structures. For example, a substrate layer such as a layer of glass or plastic may have a pattern of transparent conductive touch sensor electrodes such as indium tin oxide electrodes. This substrate layer may be attached to other display layers to form a touch sensitive display. If desired, a display layer such as a thin-film transistor layer in a liquid crystal display may be provided with indium tin oxide electrodes for a capacitive touch sensor. With this type of arrangement, both display pixel electrodes for the liquid crystal display and capacitor electrodes for the touch sensor may be formed on a common display layer substrate (e.g., a shared glass substrate layer).

Display 14 for device 10 may include display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
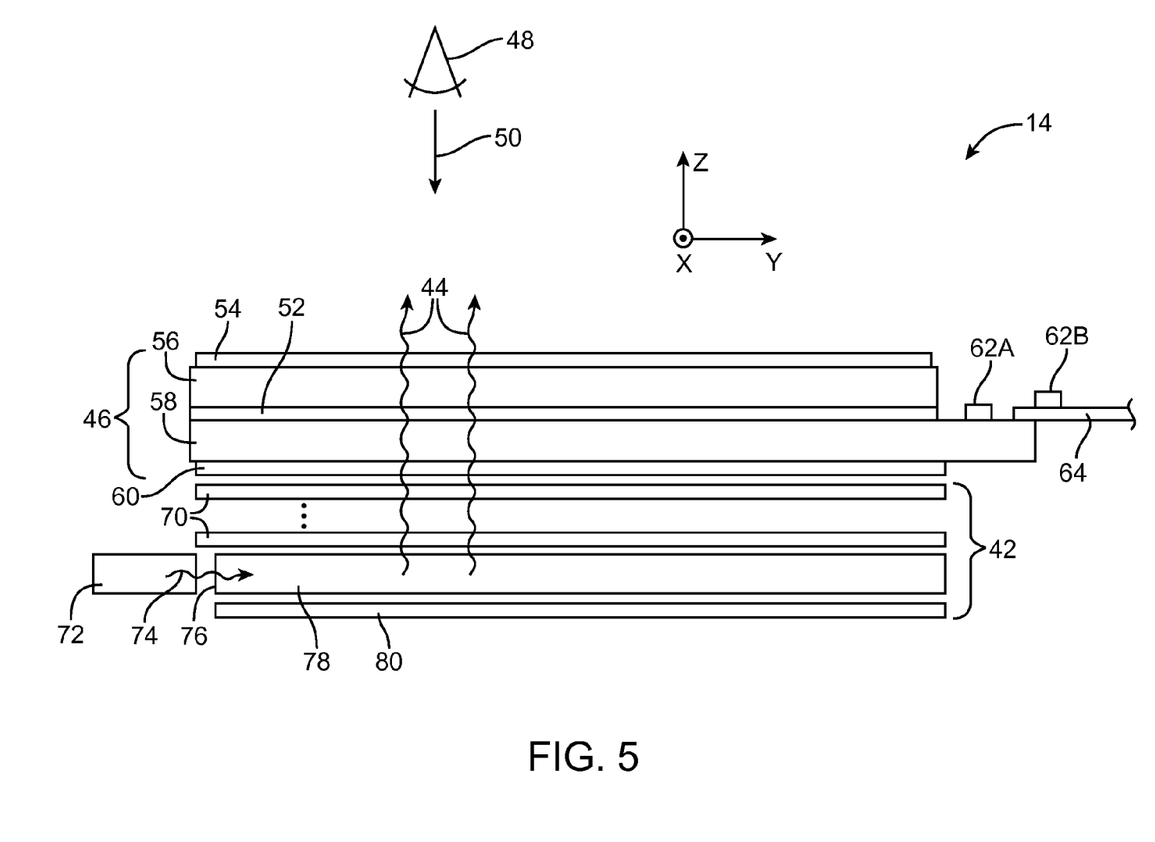
FIG. 5 is a cross-sectional side view of an illustrative display in accordance with an embodiment of the present invention.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Display driver circuitry 62A and/or 62B may drive data and control signals into the thin-film transistor circuitry of display layer 58 during operation. Touch sensor signals may be routed from electrodes in display 14 to touch sensor processing circuitry. Internal device components such as integrated circuits in device housing 12 may produce interference signals and/or may be susceptible to interference signals. As a result, it may be desirable to shield display 14 from other components in device 10. It may, for example, be desirable to incorporate a transparent conductive electrode such as a layer of indium tin oxide onto a display layer in display 14 to serve as an electromagnetic interference shield. The shield may prevent interference signals such as signals produced when operating display 14 from reaching internal device components such as wireless transceiver circuits or other sensitive device circuits. The shield may also prevent interference signals that are generated by clocks, processors, transmitters, and other integrated circuits and circuitry in device 10 from reaching display 14. This can help ensure that touch sensor circuitry in display 14 is not disrupted due to interference from within device 10.

Figure 6:
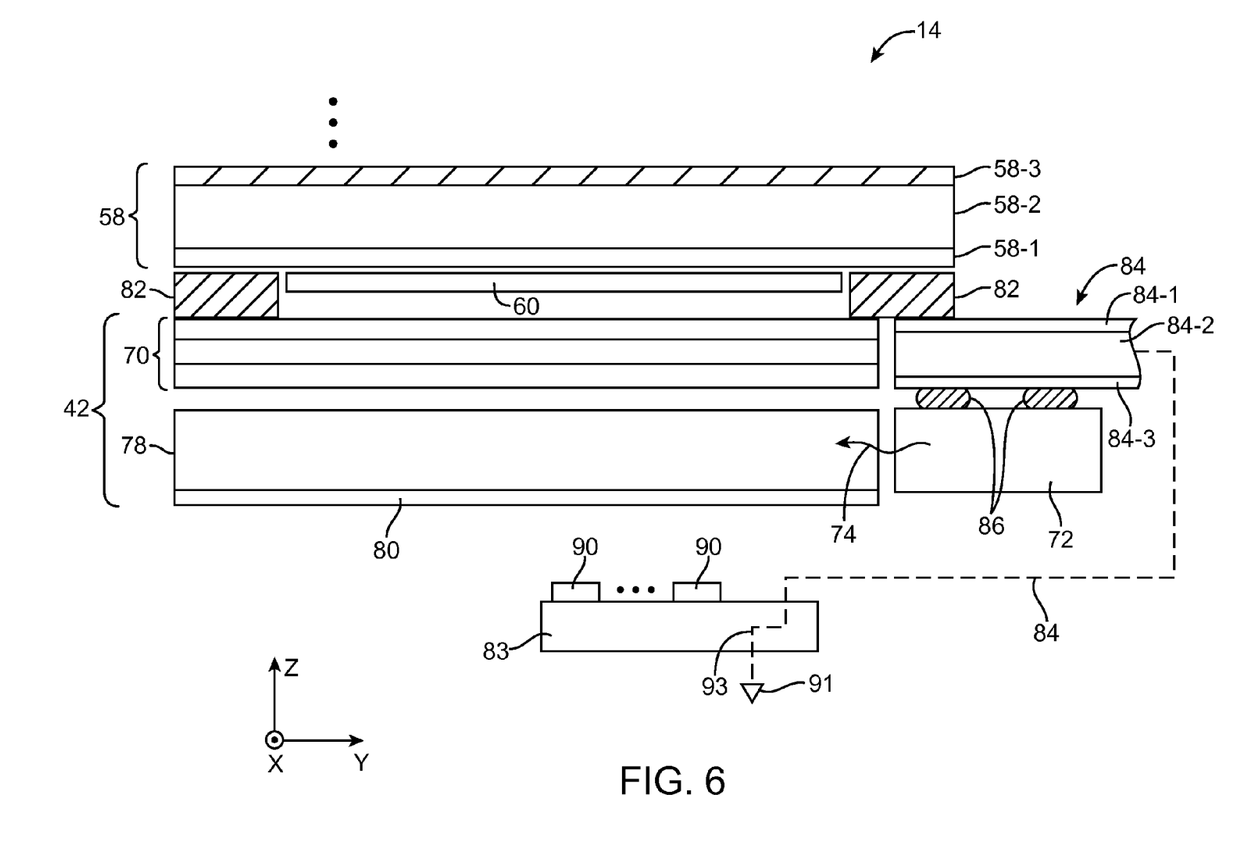
FIG. 6 is a cross-sectional side view of a portion of a display showing how the display may be provided with a shielding layer in accordance with an embodiment of the present invention.

A cross-sectional side view of a portion of display 14 showing how display 14 may be provided with electromagnetic signal interference shielding is shown in FIG. 6. In the example of FIG. 6, display 14 is a liquid crystal display of the type shown in FIG. 5. Thin-film transistor layer 58 includes a substrate such as thin-film transistor substrate 58-2 (e.g., a clear layer of glass). Thin-film transistor circuitry 58-3 may be formed on the upper surface of thin-film transistor substrate 58-2. Thin-film transistor circuitry 58-3 may include polysilicon thin-film transistors, amorphous silicon thin-film transistors, oxide thin-film transistors, or other thin-film transistors. Thin-film transistor circuitry 58-3 may also include structures such as electrodes for applying electric fields to the liquid crystal material associated with an array of display pixels, thin-film transistors for controlling the application of the electric fields by the electrodes, capacitors, etc. Thin-film transistor circuitry 58-3 may, if desired, also include touch sensor circuitry such as capacitive touch sensor electrodes (e.g., indium tin oxide electrodes in the form of an array of rectangular pads, electrode patterns with pads and lines, etc.).

As shown in FIG. 6, the lowermost (innermost) layer of thin-film transistor layer 58 (i.e., the lower surface of layer 58 opposing the upper surface of layer 58 on which the thin-film transistor circuitry and optional touch sensor electrodes are formed) may be coated with shielding layer 58-1. Lower polarizer layer 60 may be attached to the lower surface of shielding layer 58-1 (e.g., using adhesive). Lower polarizer 60 may, for example, be formed in a central rectangular portion of layer 58.

Shielding layer 58-1 may be a layer of conductive transparent material such as indium tin oxide. Shielding layer 58-1 may be deposited using physical vapor deposition or other deposition techniques. The presence of a conductive layer on the lower surface of thin-film transistor layer 58 may help block interference that is present in layer 58-2 from reaching sensitive integrated circuits and other internal components 90 in device 10 and may help block interference signals that are generated by internal components 90 from reaching touch sensor circuitry on layer 58 or other substrates in display 14.

Components 90 may include sensitive circuitry such as wireless transceiver circuitry, may include processors, may include application-specific integrated circuits, etc. Components 90 may be mounted on one or more substrates such as substrate 88 (e.g., a printed circuit such as a rigid printed circuit board formed from a material such as fiberglass-filled epoxy and/or a flexible printed circuit substrate material such as a sheet of polyimide or a layer of other flexible polymer). Components 90 have the potential to emit interference that could interfere with a touch sensor in display 14 such as an array of indium tin oxide capacitor electrodes. The presence of shielding layer 58-1 may help block these interference signals and may help block signals generated in layer 58-3 from reaching components 90 or other sensitive circuitry in device 10. If desired, shielding layer 58-1 may be formed on substrates other than thin-film transistor substrate 58-2. The configuration of FIG. 6 is merely illustrative.

Backlight unit 42 may include a light source such as light source 72. Light source 72 may emit light 74 into light guide plate 78. Reflector 80 may help reflect light that has escaped downwards from light guide plate 78 in an upwards direction through the layers of display 14 to serve as backlight. Optical films 70 may be interposed between thin-film transistor layer 58 and light guide plate 78.

Light source 72 may include components such as light-emitting diodes. The light emitting diodes may be provided with power through a backlight power supply cable such as cable 84. Cable 84 may be formed from a flexible printed circuit (sometimes referred to as a "flex circuit"). As shown in FIG. 6, backlight cable 84 may include a flexible printed circuit substrate such as polymer layer 84-2 (e.g., a layer of polyimide or other flexible dielectric) and metal traces such as upper metal traces 84-1 and lower metal traces 84-3. Metal traces 84-1 and 84-3 may be patterned by photolithography, may be patterned by shadow masking during physical vapor deposition, may be pattered by screen printing, may be patterned using ink-jet printing, may be patterned by pad printing, or may be patterned using other metal deposition and patterning techniques. Examples of metals that may be used in forming metal traces 84-1 and 84-3 include copper, gold, aluminum, other metals, metal layers that include two or more metals, etc. The metal traces may be thinner than 20 microns, thinner than 2 microns, or other suitable thickness.

Metal traces 84-3 may include metal lines for conveying power to solder joints 86 that are connected to respective terminals on light-emitting diodes 72. There may be, for example, a positive power supply trace in metal traces 84-3 that is coupled to a positive power supply terminal on each light-emitting diode 72 and a negative power supply trace in metal traces 84-3 that is coupled to a negative power supply terminal on each light-emitting diode. During operation of display 14, a battery or other source of power may be used in providing light-emitting diodes 72 with power supply signals over metal traces 84-3. The power supply signals (e.g., current signals) may turn on the light-emitting diodes and cause the light-emitting diodes to emit light 74.

Metal traces 84-1 may be ground traces that are coupled to a source of ground potential such as ground 91 (e.g., metal traces 84-1 may be considered to form part of a ground in device 10 and may be coupled to a ground terminal such as ground 91 through traces such as traces 93 within printed circuit substrates such as substrate 88). Ground 91 may be formed from portions of housing 12, from a ground plane on printed circuit substrate 88, from metal housing structures in the interior of device 10, or from other ground structures.

Shielding layer 58-1 may provide effective shielding when grounded to ground 91. With one suitable arrangement, grounding structures such as grounding structures 82 may be used to couple shielding layer 58-1 to ground traces 84-1 and thereby couple shielding layer 58-1 to ground. As shown in FIG. 6, the upper surface of grounding structures 82 may contact and bear against the lower surface of shielding layer 58-1 and the lower surface of grounding structures 82 may contact and bear against the upper surface of ground traces 84-1 in backlight unit power supply cable 84. Shorting shielding layer 58-1 to ground in this way helps ensure that shielding layer 58-1 can effectively prevent interference from display 14 from reaching internal device components under shielding layer 58-1 such as components 90.

Grounding structures 82 may be formed from metal tape, conductive adhesive, metal tape that is coated on its upper and/or lower surfaces by conductive adhesive, conductive paint (e.g., silver paint or other metal paint), solder, weld structures, conductive fabric, conductive foam, other conductive materials and/or combinations of two or more of these structures. Grounding structures 82 preferably run along some or all of the peripheral edges of shielding layer 58-1 and display 14 (e.g., grounding structures 82 may have a rectangular ring shape that surrounds lower polarizer 60). This allows a satisfactory low-resistance path to be formed between shielding layer 58-1 and ground 91 without blocking light from travelling through display 14.

Figure 7:
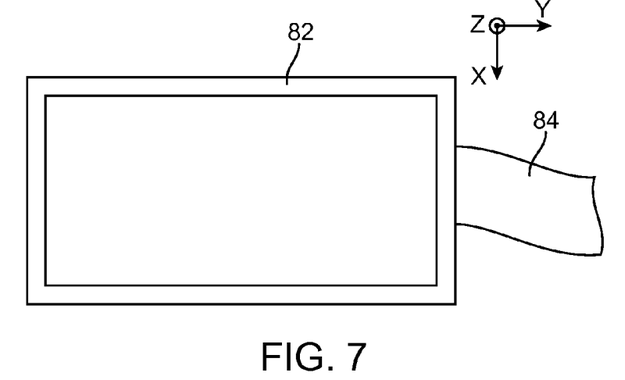
FIG. 7 is a top view of an illustrative rectangular ring-shaped grounding structure that may be used to electrically connect a shielding layer in a display to ground in accordance with an embodiment of the present invention.
Figure 8:
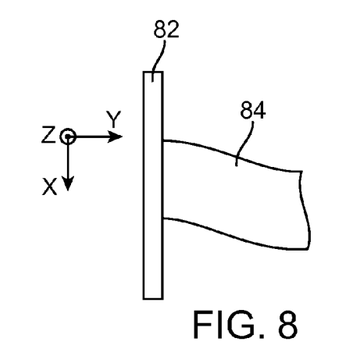
FIG. 8 is a top view of an illustrative grounding structure having the shape of a strip of conductor that runs along the edge of a display that may be used to electrically connect a shielding layer in a display to ground in accordance with an embodiment of the present invention.
Figure 9:
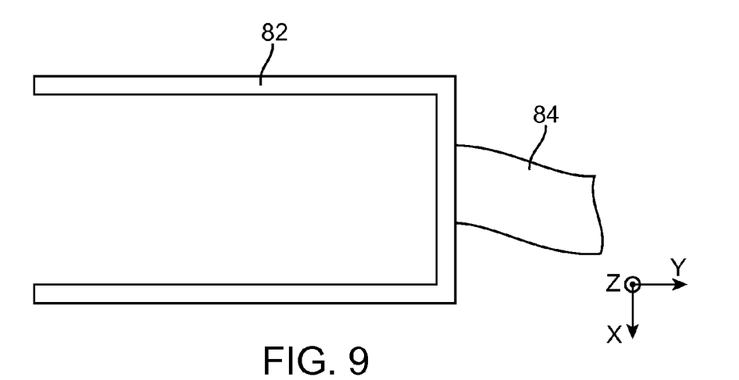
FIG. 9 is a top view of an illustrative U-shaped grounding structure that may be used to electrically connect a shielding layer in a display to ground in accordance with an embodiment of the present invention.

As shown in the top view of illustrative grounding structures 82 of FIG. 7, grounding structures 82 may have the shape of a rectangular ring that runs around the rectangular periphery of thin-film transistor layer 58 and the other rectangular display layers in display 14. The rectangular opening in the center of the rectangular ring may be sized to accommodate lower polarizer 60 (e.g., lower polarizer 60 may be located within the opening in the rectangular ring-shaped grounding structures). Backlight unit flexible printed circuit cable 84 may be attached along one edge of the rectangular ring formed by grounding structures 82. As shown in the top view of illustrative grounding structures 82 of FIG. 8, grounding structures 82 may have the shape of a strip of metal having an elongated footprint running along one of the edges of shielding layer 58-1 and display 14. FIG. 9 is a top view of illustrative grounding structures 82 in a configuration in which grounding structures 82 have a U-shape that runs along three of the four edges of shielding layer 58-1 and display 14. Other layouts may be used for grounding structures 82 if desired. The configurations of FIGS. 7, 8, and 9 are merely illustrative.

Figure 10:
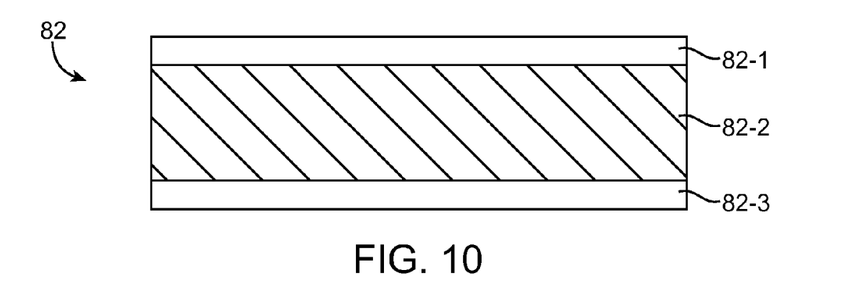
FIG. 10 is a cross-sectional side view of a portion of an illustrative grounding structure having a layer of metal or other conductor sandwiched between upper and lower layers of conductive adhesive in accordance with an embodiment of the present invention.

As shown in the cross-sectional side view of FIG. 10, grounding structures 82 may be formed from multiple layers of material. For example, grounding structures 82 may be formed from a central layer such as layer 82-2 that is sandwiched between lower layer 82-3 and upper layer 82-1. Layers 82-1, 82-2, and 82-3 may be formed from conductive materials. As an example, layers 82-1 and 82-3 may be conductive adhesive layers and layer 82-2 may be a metal layer (e.g., a layer of metal foil) that is interposed between layers 82-1 and 82-3.

Figure 11:
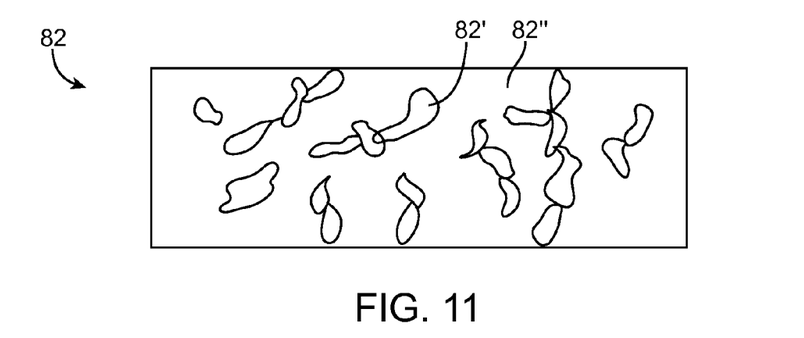
FIG. 11 is a cross-sectional side view of a portion of an illustrative grounding structure such as a conductive paint grounding structure in accordance with an embodiment of the present invention.

FIG. 11 is a cross-sectional side view of grounding structures 82 in a configuration in which grounding structures 82 have been formed from conductive particles 82' in a carrier material 82". Conductive particles 82' may be metal particles and carrier material 82" may be a solvent-based binder that at least partly evaporates after being applied between shielding layer 58-1 and ground 91 (e.g., layer 82 of FIG. 11 may be a layer of conductive paint such as metal paint).

Figure 12:
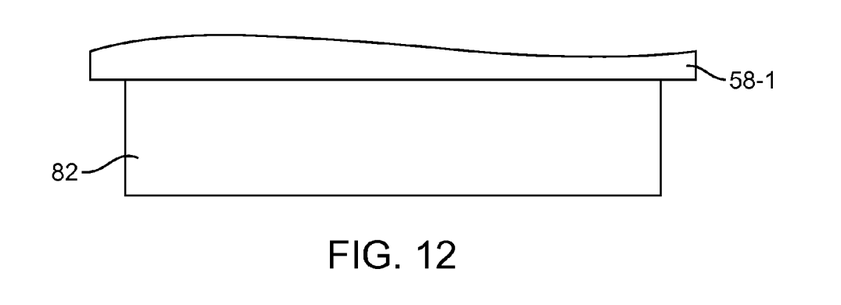
FIG. 12 is a cross-sectional side view of an illustrative grounding structure formed on the lower surface of a shielding layer in accordance with an embodiment of the present invention.

In the example of FIG. 12, grounding structures 82 have been formed from a solid layer of material that is located adjacent to shield layer 58-1 (e.g., a layer of material that is formed on the underside of shield layer 58-1 or that is otherwise attached to the underside of shield layer 58-1). Layer 58-1 may be a layer of conductive foam, a layer of metal, a layer of conductive adhesive, a layer of conductive fabric, or other conductive layer.

Figure 13:
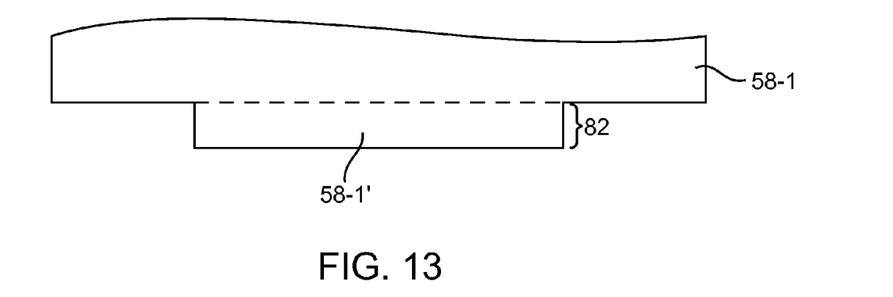
FIG. 13 is a cross-sectional side view of an illustrative grounding structure formed from raised ridge structures or other protruding portions of a transparent conductive shielding structure in accordance with an embodiment of the present invention.

FIG. 13 shows how grounding structures 82 may be formed from a portion of material that is part of shielding layer 58-1. Shielding layer 58-1 may, for example, be formed from a layer of transparent conductive material such as indium tin oxide. Grounding structures 82 may be formed from a raised area of shielding layer 58-1 such as protruding portion 58-1' (e.g., a raised rectangular ring-shaped ridge). Protrusion 58-1' may protrude downwards away from the lower surface of thin-film layer 58 to help short shielding layer 58-1 to ground trace 84-1 in backlight unit flexible printed circuit cable 84. Techniques such as grinding (polishing), laser processing, physical vapor deposition (e.g., with shadow masking), etching, and other techniques may be used in forming a shielding layer such as shielding layer 58-1 of FIG. 13 in which grounding structures 82 form an integral portion of shielding layer 58-1.

Figure 14:
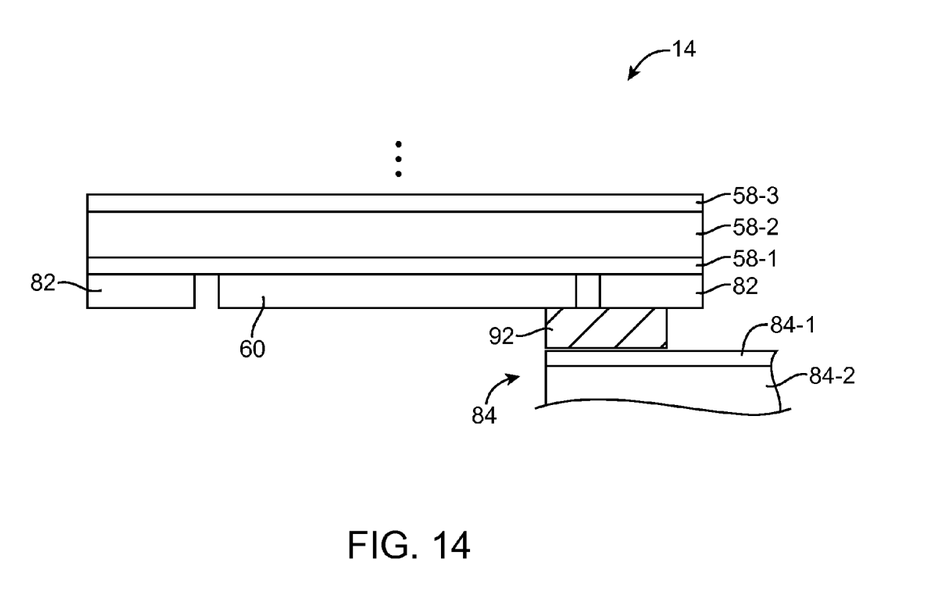
FIG. 14 is a cross-sectional side view of a portion of a display in which a two-part grounding structure is being used to electrically couple a shielding layer on the display to ground in accordance with an embodiment of the present invention.

If desired, more than one layer of structures may be interposed between shield layer 58-1 and ground traces 84-1 on flexible printed circuit cable 84. This type of configuration is shown in FIG. 14. As shown in FIG. 14, grounding structures 82 may form an electrical connection with the lower surface of shielding layer 58-1.

Grounding structures 82 may, for example, be formed on the lower surface of shielding layer 58-1 (e.g., using physical vapor deposition or other deposition techniques), may be attached to the lower surface of shielding layer 58-1 (e.g., using conductive adhesive, solder, welds, etc.), or may otherwise be mounted in display 14 adjacent to shielding layer 58-1 and in electrical contact with shielding layer 58-1.

Grounding structures 92 may be interposed between the lower surface of a portion of grounding structures 82 and ground traces 84-1 in backlight unit flexible printed circuit power supply cable 84. Grounding structures 92 may have an upper surface that is in contact with the lower surface of grounding structures 82 and may have a lower surface that is in contact with metal ground traces 84-1 on flexible printed circuit cable 84. Grounding structures 92 and/or grounding structures 82 may be formed from multilayer structures of the type described in connection with FIG. 10, from metal paint or other structures of the type described in connection with FIG. 11, from a layer of material of the type described in connection with FIG. 12, from an integral protrusion of another layer as described in connection with protrusion 58-1' of shielding layer 58-1, from solder, welds, conductive adhesive, conductive fabric, conductive tape, conductive metal foil, or other conductive materials.

There are two layers of grounding structures (grounding structures 82 and grounding structures 92) that are interposed between the lower surface of shielding layer 58-1 and the upper surface of the signal line formed from ground traces 84-1 on backlight unit cable 84 in the example of FIG. 14. This is merely illustrative. Any suitable number of different conductive structures may be coupled in series between shielding layer 58-1 and ground traces 84-1 or other source of ground potential if desired.

Figure 15:
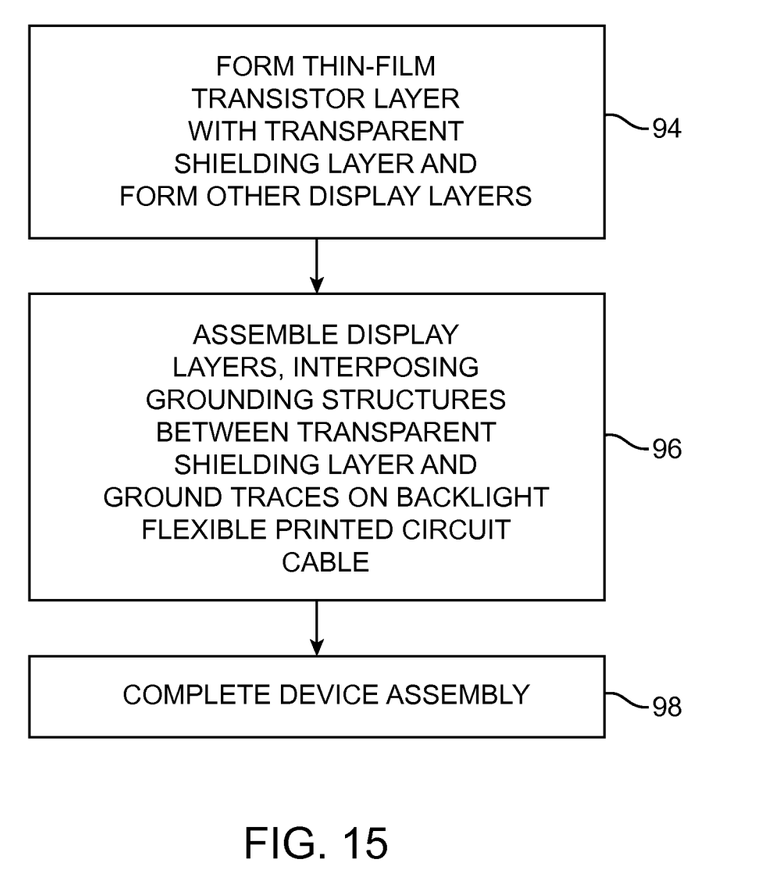
FIG. 15 is a flow chart of illustrative steps involved in forming an electronic device with a grounded display shielding structure in accordance with an embodiment of the present invention.

FIG. 15 is a flow chart of illustrative steps involved in forming an electronic device with a grounded display shielding structure. At step 94, display layers for display 14 may be formed such as color filter layer 56 and thin-film transistor layer 58. Thin-film transistor layer 58 may include a layer of thin-film transistor circuitry such as thin-film transistor circuit layer 58-3, a substrate layer such as substrate layer 58-2 (e.g., a layer of transparent glass or plastic), and a shielding layer such as shielding layer 58-1 (e.g., a conductive transparent layer such as a layer of indium tin oxide or other transparent conductor).

At step 96, the layers of display 14 may be assembled (e.g., a display or display module for device 10 may be formed) and during the operations of step 98, the display layers (e.g. an assembled display module and/or individual layers of display 14) may be mounted in housing 12 with other device components such as components 90 to form electronic device 10. During the assembly operations of steps 96 and/or 98, grounding structures such as grounding structures 82 and, if desired, grounding structures 92, may be interposed between the lower surface of shielding layer 58-1 and the upper surface of a ground such as ground traces 84-1 on flexible printed circuit backlight unit cable 84 or other conductor coupled to a source of ground potential.

The foregoing is merely illustrative of the principles of this invention and various modifications can be made by those skilled in the art without departing from the scope and spirit of the invention.

What is claimed is:

1. A display, comprising:
   display layers configured to display images, wherein the display layers include a transparent thin-film transistor layer having a glass substrate;
   a conductive transparent shielding layer on the glass substrate;
   a backlight unit;
   a metal trace on a first surface of a dielectric, wherein the dielectric has a second surface opposite the first surface;
   signal lines on the second surface that provide signals to the backlight unit; and
   a grounding structure having first and second opposing surfaces that grounds the conductive transparent shielding layer to the metal trace, wherein the grounding structure is interposed between the transparent thin-film transistor layer and the dielectric such that the first surface contacts the conductive transparent shielding layer and the second surface contacts the metal trace.

2. The display defined in claim 1, wherein the backlight unit comprises light-emitting diodes.

3. The display defined in claim 1 wherein the dielectric comprises a flexible polymer layer.

4. The display defined in claim 1 wherein the grounding structure comprises conductive tape having a conductive metal layer sandwiched between opposing conductive adhesive layers.

5. The display defined in claim 1 wherein the display layers include a touch sensor array.

6. The display defined in claim 5 wherein the touch sensor array comprises an array of capacitive touch sensor electrodes.

7. The display defined in claim 6 wherein the grounding structure comprises a rectangular ring-shaped structure that runs along a peripheral edge of the thin-film transistor layer.

8. The display defined in claim 1 wherein the glass substrate has opposing first and second surfaces, wherein the thin-film transistor layer comprises thin-film transistor circuitry on the first surface, wherein the conductive transparent shielding layer is formed on the second surface, and wherein the display further comprises a polarizer layer on the conductive transparent shielding layer.

9. The display defined in claim 8 wherein the grounding structure has a rectangular opening in which the polarizer layer is located and wherein the metal trace and the dielectric form portions of a flexible printed circuit backlight unit cable.

10. The apparatus defined in claim 1 wherein the second surface directly contacts the metal trace.

11. A display, comprising:
    a color filter layer;
    a thin-film transistor layer having a thin-film transistor substrate;
    a layer of liquid crystal material between the color filter layer and the thin-film transistor layer;
    a backlight;
    an upper polarizer and a lower polarizer, wherein the color filter layer, the thin-film transistor layer, and the layer of liquid crystal material are located between the upper polarizer and the lower polarizer, and wherein the lower polarizer is interposed between the backlight and the thin-film transistor layer;
    a conductive transparent shielding layer interposed between the thin-film transistor substrate and the lower polarizer;
    a ground trace on a first surface of a dielectric substrate;
    patterned metal traces on a second surface of the dielectric substrate opposite the first surface, wherein the patterned metal traces supply signals to the backlight; and
    grounding structures that couple the conductive transparent shielding layer to the ground trace.

12. The display defined in claim 11 wherein the backlight comprises light-emitting diodes mounted to the flexible printed circuit.

13. The apparatus defined in claim 11, wherein the color filter layer is interposed between the thin-film transistor layer and the upper polarizer.

14. Apparatus, comprising:
    a color filter layer;
    a thin-film transistor layer having a surface with a layer of thin-film circuitry and an opposing surface with a conductive transparent shielding layer;
    a layer of liquid crystal material between the color filter layer and the thin-film transistor layer;
    a dielectric substrate that is separate from the thin-film transistor layer and that has first and second opposing surfaces;
    a metal trace on the first surface of the dielectric substrate;
    at least one signal line on the second surface of the dielectric substrate;

grounding structures that ground the conductive transparent shielding layer to the metal trace on the first surface of the dielectric substrate, wherein the grounding structures are interposed between the thin-film transistor layer and the dielectric substrate; and a display backlight unit having light-emitting diodes, wherein the at least one signal line on the second surface of the dielectric substrate comprises patterned metal traces that supply signals to the light-emitting diodes.

15. The apparatus defined in claim 14 wherein the dielectric substrate comprises a flexible polymer.

16. The apparatus defined in claim 14 wherein the grounding structures include a layer of metal.

17. The apparatus defined in claim 16 wherein the layer of metal has a rectangular ring shape that runs along a peripheral edge of the thin-film transistor layer.

18. The apparatus defined in claim 16 wherein the layer of metal has opposing upper and lower surfaces and wherein the grounding structures include a first layer of conductive adhesive on the upper surface and a second layer of conductive adhesive on the lower surface.

19. The apparatus defined in claim 14 wherein the grounding structures comprise:

a rectangular ring-shaped conductive layer that is adjacent to the conductive transparent shielding layer and that runs along a peripheral edge of the conductive transparent shielding layer; and a conductive structure that is separate from the rectangular ring-shaped conductive layer and that grounds the rectangular ring-shaped conductive layer to the metal trace.

* * * * *